United States Patent
Rajaa et al.

(10) Patent No.: US 9,110,918 B1
(45) Date of Patent: Aug. 18, 2015

(54) SYSTEMS AND METHODS FOR MEASURING COMPLIANCE WITH A RECOVERY POINT OBJECTIVE FOR AN APPLICATION

(75) Inventors: Subash Rajaa, Pune (IN); Ashish Gawali, Pune (IN)

(73) Assignee: Symantec Corporation, Mountain View, CA (US)

( * ) Notice: Subject to any disclaimer, the term of this patent is extended or adjusted under 35 U.S.C. 154(b) by 1450 days.

(21) Appl. No.: 12/493,462

(22) Filed: Jun. 29, 2009

(51) Int. Cl.
*G06F 7/00* (2006.01)
*G06F 17/30* (2006.01)

(52) U.S. Cl.
CPC .............................. *G06F 17/30215* (2013.01)

(58) Field of Classification Search
USPC ............... 707/613, 637, 999.202, 999.204, 707/E17.007
See application file for complete search history.

(56) References Cited

U.S. PATENT DOCUMENTS

| | | | |
|---|---|---|---|
| 5,657,440 A * | 8/1997 | Micka et al. ............. 714/16 |
| 6,389,016 B1 * | 5/2002 | Sabaa et al. ............. 370/389 |
| 7,191,225 B1 * | 3/2007 | Borthakur ............. 709/213 |
| 7,702,871 B1 * | 4/2010 | Arnon et al. ............. 711/167 |
| 7,756,831 B1 * | 7/2010 | Rao ............. 707/638 |
| 2002/0095479 A1 * | 7/2002 | Schmidt ............. 709/218 |
| 2003/0110190 A1 * | 6/2003 | Achiwa et al. ............. 707/203 |
| 2006/0129562 A1 * | 6/2006 | Pulamarasetti et al. ....... 707/10 |
| 2009/0138471 A1 * | 5/2009 | Zhang et al. ............. 707/6 |
| 2009/0157768 A1 * | 6/2009 | Ichikawa et al. ............. 707/202 |
| 2009/0183027 A1 * | 7/2009 | Subhraveti ............. 714/13 |
| 2009/0198949 A1 * | 8/2009 | Kuligowski et al. ....... 711/203 |
| 2010/0306500 A1 * | 12/2010 | Mimatsu ............. 711/209 |

* cited by examiner

*Primary Examiner* — Uyen Le
(74) *Attorney, Agent, or Firm* — ALG Intellectual Property, LLC

(57) ABSTRACT

A computer-implemented method for measuring compliance with a recovery point objective for an application may include identifying a set of mount points on a primary site written to by the application. The computer-implemented method may also include identifying a second site used for asynchronous replication of the primary site. The computer-implemented method may further include periodically updating a time value on each mount point in the set of mount points on the primary site. The computer-implemented method may additionally include, for each mount point in the set of mount points, measuring a replication lag by calculating a difference between the time value on the mount point and a replication of the time value on a corresponding mount point on the secondary site. Various other methods, systems, and computer-readable media are also disclosed.

20 Claims, 9 Drawing Sheets

SYSTEMS AND METHODS FOR MEASURING COMPLIANCE WITH A RECOVERY POINT OBJECTIVE FOR AN APPLICATION

BACKGROUND

Organizations increasingly depend on critical applications and data in the course of business. Accordingly, an organization may wish to control the risk of losing any data managed by an application. For example, the application might run at a local computing site where a disaster could occur, destroying the application, its data, and any local backup mechanisms. The organization might ameliorate such a risk by replicating the data to a remote site (e.g., mirroring, at the remote site, the volumes on which the application and data reside).

Data replication may be synchronous, meaning that a change to the data at the local (or primary) site must first be committed to the remote (or secondary) site. Synchronous data replication may help to ensure that any data processed by the application will be recoverable. However, synchronous data replication may create latency in the application (i.e., the application may stall while the primary site waits for a change verification from the secondary site).

Because of the drawbacks of synchronous replication, an organization may employ an asynchronous replication system. Asynchronous replication may commit a change to the data at the primary site without first ensuring that the change is made to the secondary site. Consequently, some data processed by the application may not be recoverable (e.g., if the primary site is destroyed after a change to the data is committed to the primary site but before the change is fully transmitted to the secondary site).

In the course of planning and/or administrating a system for asynchronous replication, an organization may set standards for acceptable data loss in case of a disaster. One such standard may be a recovery point objective. The recovery point objective may set an acceptable level of data loss, measured in time (e.g., the length of time during which, in the case of a primary site disaster, changes will be committed to the primary site but will never successfully be made to the secondary site).

In order to assess the potential data loss in case of a disaster, a system may be equipped to perform a disaster recovery test. Some technologies may attempt to measure data loss during the disaster recovery test. For example, certain hardware-based replication systems may report the percentage of changed data for the primary site and the secondary site. However, the organization may prefer or require the potential data loss to be reported in terms of time. For instance, a service-level agreement may require a certain recovery point objective, which may only be expressed in terms of time.

An additional disadvantage of measuring data loss through certain hardware-based replication systems may be that a hardware-based replication system may report data loss relating to logical units (e.g., LUNS). Assessing the data loss corresponding to a particular application may still require mapping logical units to the application. Such a mapping may require specific consideration of the volume manager, operating system, and storage array in use. Furthermore, if the application runs on a virtual machine, the mapping may require specific consideration of the hypervisor managing the virtual machine.

SUMMARY

As will be described in greater detail below, the instant disclosure generally relates to systems and methods for measuring compliance with a recovery point objective for an application.

An identification module may identify a set of mount points on a primary site written to by the application and identify a secondary site used for asynchronous replication of the primary site. An update module may periodically update a time value on each mount point in the set of mount points on the primary site. A measurement module may then, for each mount point in the set of mount points, measure a replication lag by calculating a difference between the time value on the mount point and a replication of the time value on a corresponding mount point on the secondary site.

A determination module may determine a longest replication lag for any mount point in the set of mount points. A notification module may then determine that the longest replication lag exceeds the recovery point objective for the application and provide a notice of a violation of the recovery point objective.

The time value may include a sequentially incremented number and/or a time stamp. The identification module may identify the set of mount points by retrieving the set of mount points from a configuration file.

The identification module may also identify a separate recovery point objective for each mount point. The notification module may then determine, for at least one mount point, that the replication lag exceeds the separate recovery point objective, and may then provide a notice of a recovery point objective violation.

A session module may store a session identification number on each mount point in the set of mount points. The session module may then determine that a periodic update of the time value failed and change the session identification number for the mount point. The session module may also determine that the session identification number for the mount point does not match a replication of the session identification number on a corresponding mount point on the secondary site, and may then invalidate the measurement of the replication lag.

The update module may update the time value on the mount point by updating the time value in a file stored on the mount point. Additionally or alternatively, the update module may update the time value on the mount point by updating the time value in metadata of a file system of the mount point.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
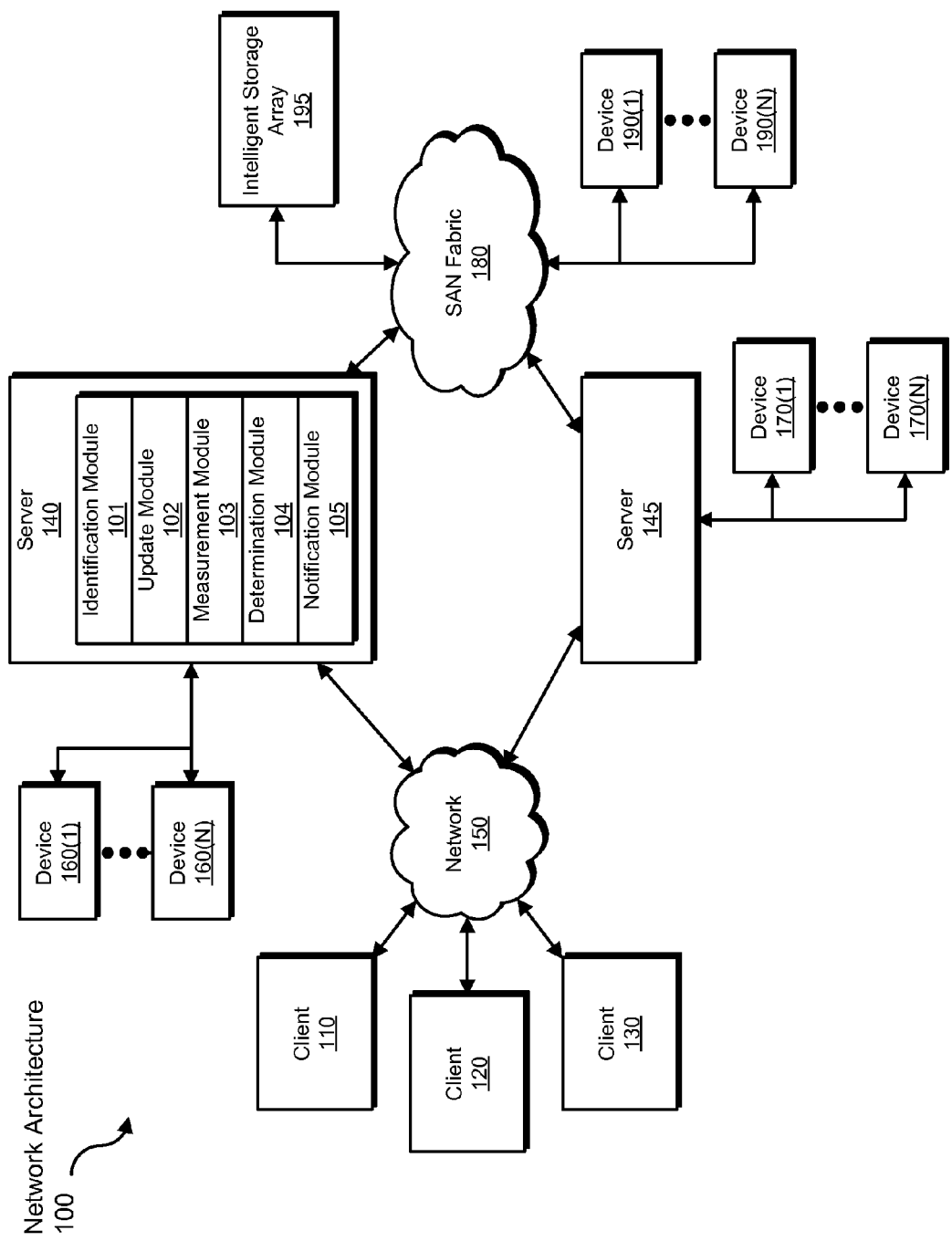
FIG. 1 is a block diagram of an exemplary computing network capable of implementing one or more of the embodiments described and/or illustrated herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for measuring compliance with a recovery point objective for an application. In some embodiments, an identification module may identify a set of mount points on a primary site written to by the application. The identification module may also identify a secondary site used for asynchronous replication of the primary site. An update module may periodically update a time value (e.g., within a file or within file system metadata) on each mount point in the set of mount points on the primary site. A measurement module may, for each mount point in the set of mount points, measure a replication lag by calculating a difference between the time value on the mount point and a replication of the time value on a corresponding mount point on the secondary site (e.g., the replicated version of the mount point).

Embodiments of the instant disclosure may provide various features and advantages not provided by conventional methods. For example, some embodiments may measure compliance with a recovery point objective without regard to which files of an application are best suited for tracking during a disaster recovery test. Furthermore, some embodiments described herein may operate independently of any specific volume manager, operating system, storage device or array, and/or virtual environment or hypervisor. Embodiments of the instant disclosure may also be faster than traditional compliance systems because traditional compliance systems may require an application to boot up during a disaster recovery test, while embodiments of the instant disclosure may not require application boot up.

In some embodiments, a compliance system may preemptively identify recovery point objective violations by continuously performing writes on a mount point. In contrast, when an application is not performing input/output operations, recovery point objective issues may go undetected in traditional systems. Thus, compliance measurement systems disclosed herein may be easier to implement, design, maintain, and/or configure within a variety of contexts.

Figure 2:
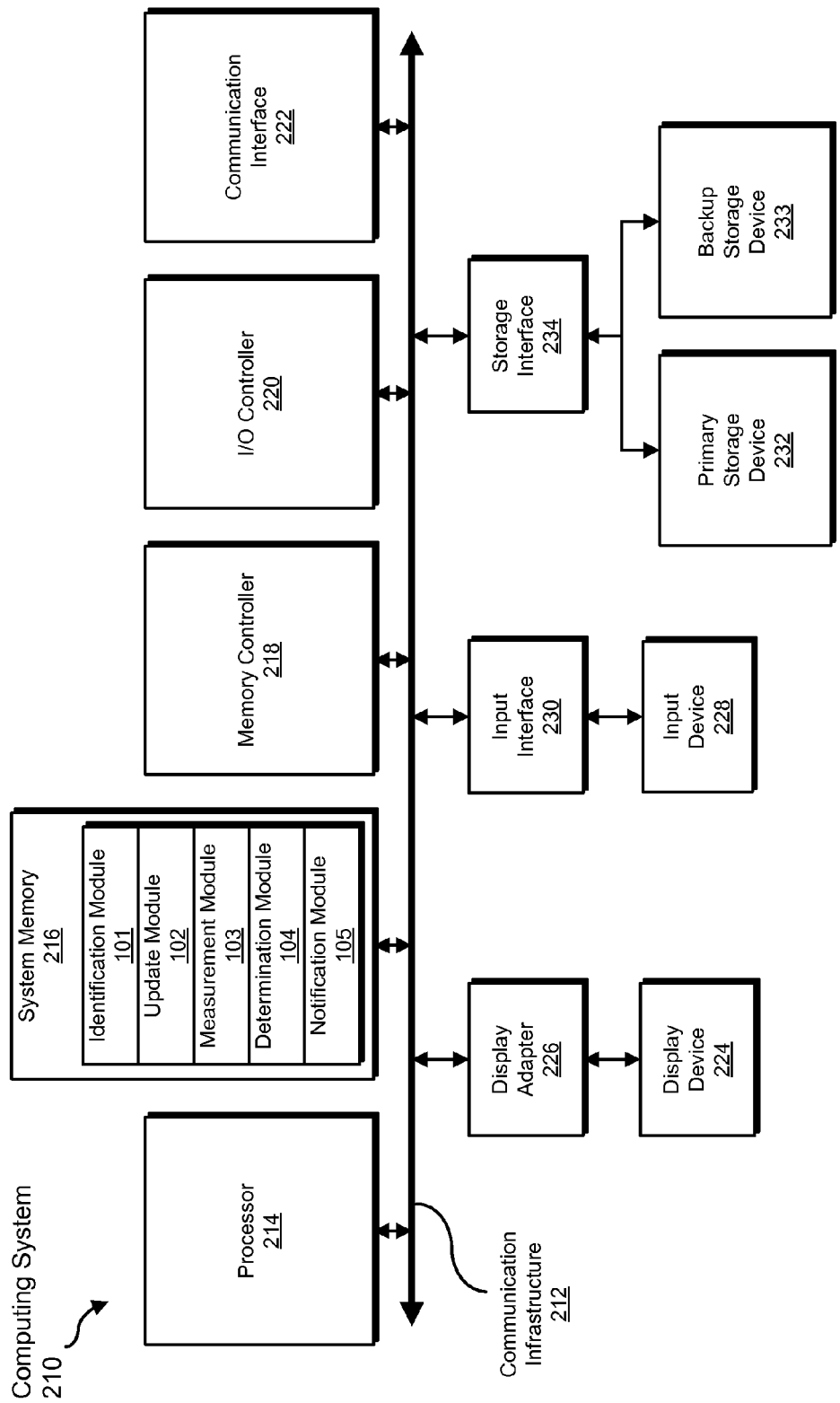
FIG. 2 is a block diagram of an exemplary computing system capable of implementing one or more of the embodiments described and/or illustrated herein.
Figure 3:
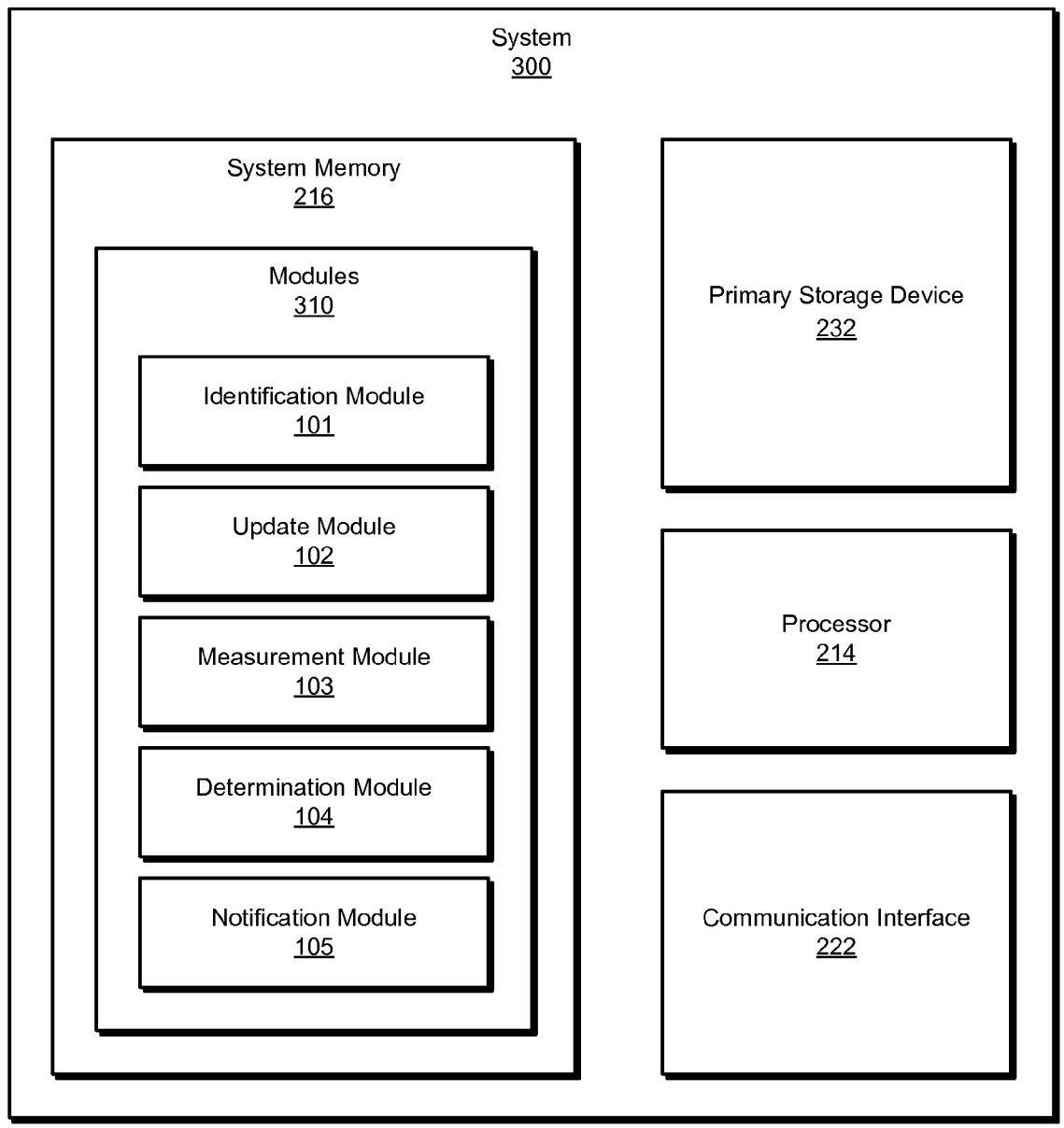
FIG. 3 is a block diagram of an exemplary system for measuring compliance with a recovery point objective for an application.
Figure 4:
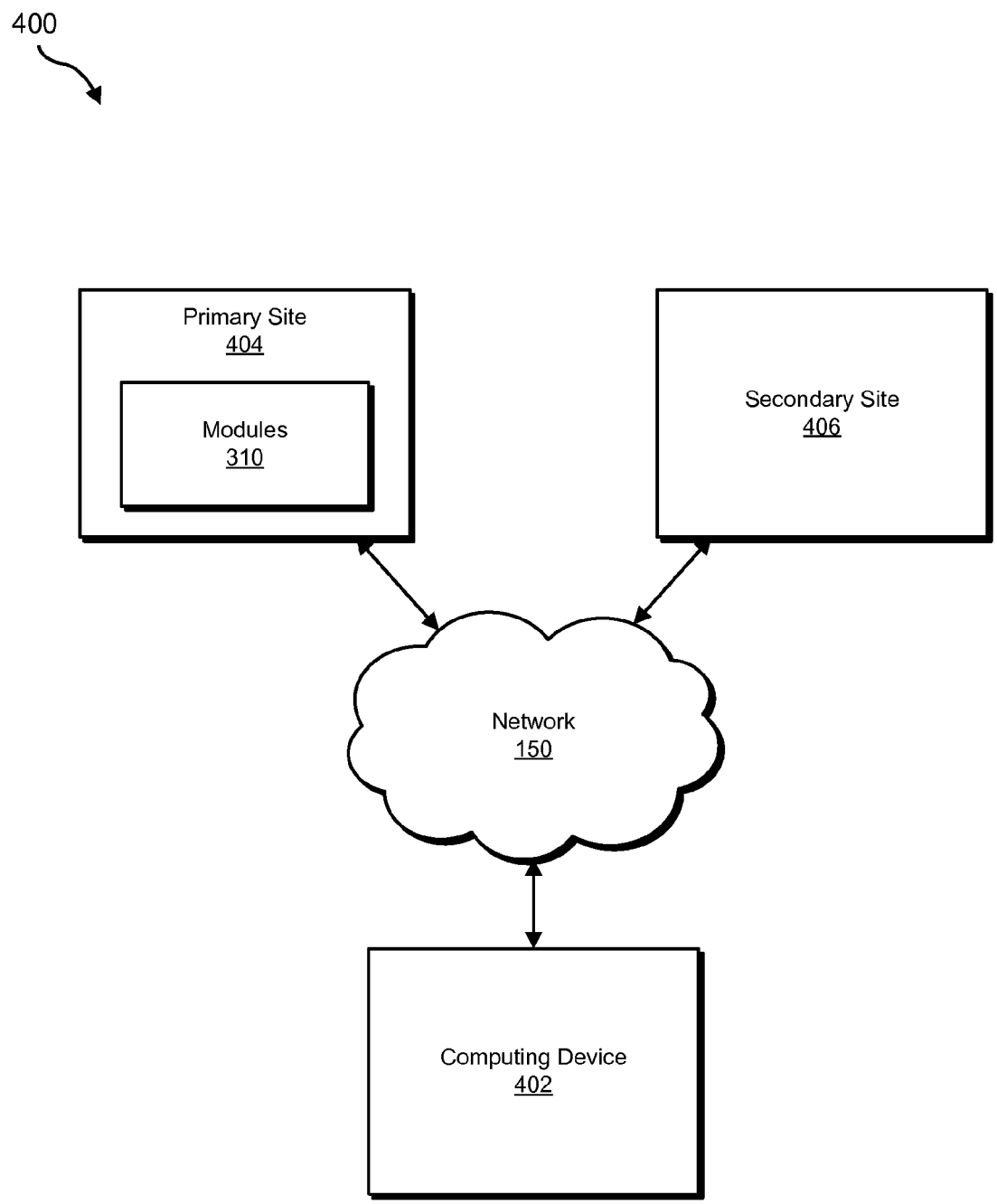
FIG. 4 is a block diagram of an exemplary system for measuring compliance with a recovery point objective for an application.
Figure 5:
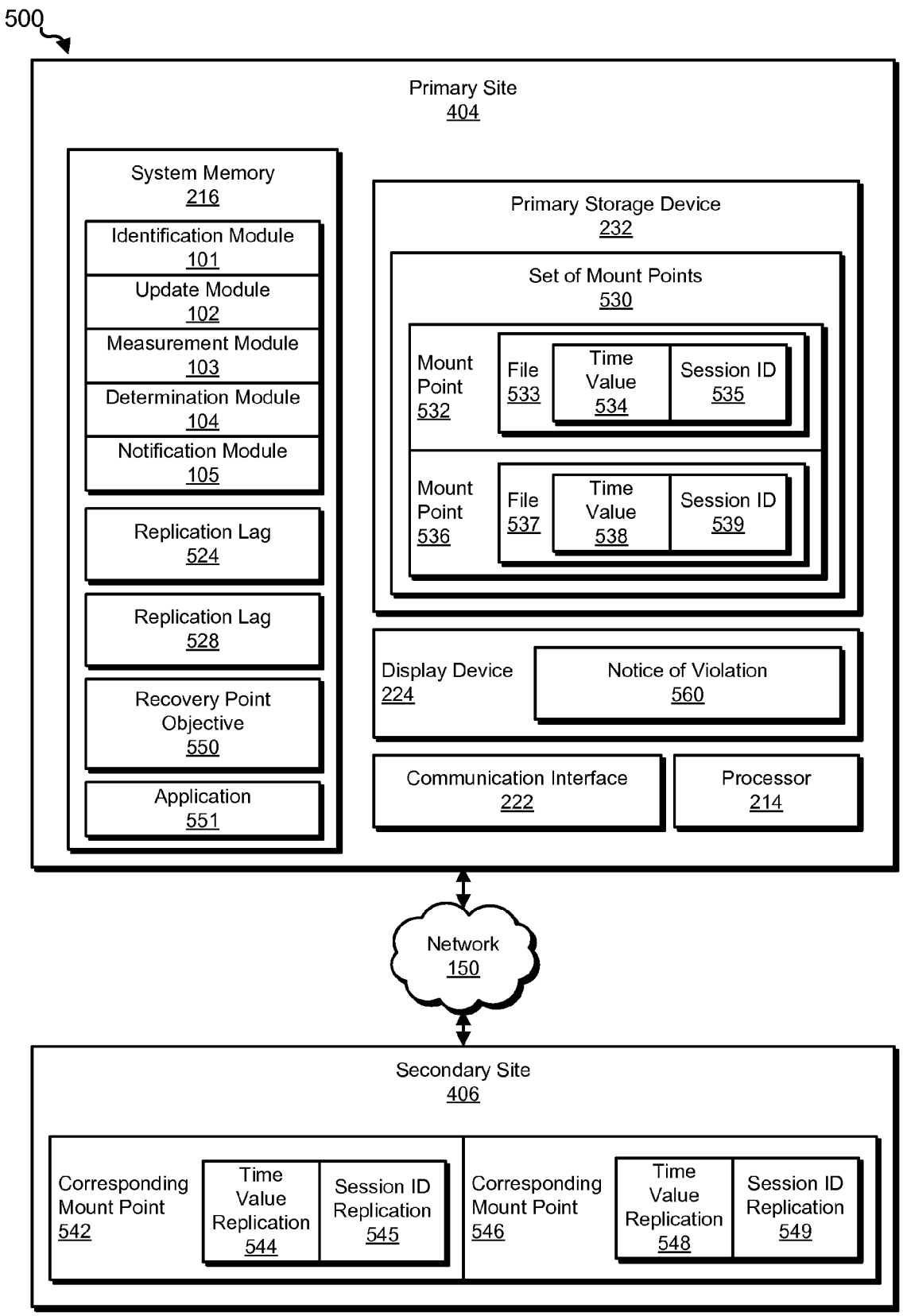
FIG. 5 is a block diagram of an exemplary system for measuring compliance with a recovery point objective for an application.

FIGS. 1 and 2 show an exemplary network architecture and computing system capable of measuring compliance with a recovery point objective for an application. FIGS. 3-5 show block diagrams illustrating exemplary systems for measuring compliance with a recovery point objective for an application. FIGS. 6-9 show exemplary methods for accomplishing the same.

FIG. 1 is a block diagram of an exemplary network architecture 100 in which client systems 110, 120, and 130 and servers 140 and 145 may be coupled to a network 150. Client systems 110, 120, and 130 generally represent any type or form of computing device or system, such as exemplary computing system 210 in FIG. 2. In one example, client system 110 may include system 300 from FIG. 3.

Similarly, servers 140 and 145 generally represent computing devices or systems, such as application servers or database servers, configured to provide various database services and/or run certain software applications. Network 150 generally represents any telecommunication or computer network including, for example, an intranet, a wide area network (WAN), a local area network (LAN), a personal area network (PAN), or the Internet.

Server 140 may include an identification module 101, an update module 102, a measurement module 103, a determination module 104, and/or a notification module 105. These modules, as will be discussed in greater detail in FIG. 3, may be programmed to measure compliance with a recovery point objective for an application.

As illustrated in FIG. 1, one or more storage devices 160(1)-(N) may be directly attached to server 140. Similarly, one or more storage devices 170(1)-(N) may be directly attached to server 145. Storage devices 160(1)-(N) and storage devices 170(1)-(N) generally represent any type or form of storage device or medium capable of storing data and/or other computer-readable instructions. In certain embodiments, storage devices 160(1)-(N) and storage devices 170(1)-(N) may represent network-attached storage (NAS) devices configured to communicate with servers 140 and 145 using various protocols, such as NFS, SMB, or CIFS.

Servers 140 and 145 may also be connected to a storage area network (SAN) fabric 180. SAN fabric 180 generally represents any type or form of computer network or architecture capable of facilitating communication between a plurality of storage devices. SAN fabric 180 may facilitate communication between servers 140 and 145 and a plurality of storage devices 190(1)-(N) and/or an intelligent storage array 195. SAN fabric 180 may also facilitate, via network 150 and servers 140 and 145, communication between client systems 110, 120, and 130 and storage devices 190(1)-(N) and/or intelligent storage array 195 in such a manner that devices 190(1)-(N) and array 195 appear as locally attached devices to client systems 110, 120, and 130. As with storage devices 160(1)-(N) and storage devices 170(1)-(N), storage devices 190(1)-(N) and intelligent storage array 195 generally represent any type or form of storage device or medium capable of storing data and/or other computer-readable instructions.

In certain embodiments, and with reference to exemplary computing system 210 of FIG. 2, a communication interface, such as communication interface 222 in FIG. 2, may be used to provide connectivity between each client system 110, 120, and 130 and network 150. Client systems 110, 120, and 130 may be able to access information on server 140 or 145 using, for example, a web browser or other client software. Such software may allow client systems 110, 120, and 130 to access data hosted by server 140, server 145, storage devices 160(1)-(N), storage devices 170(1)-(N), storage devices 190(1)-(N), or intelligent storage array 195. Although FIG. 1 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 140, server 145, storage devices 160(1)-(N), storage devices 170(1)-(N), storage devices 190(1)-(N), intelligent storage array 195, or any combination thereof. All or a portion of one or more of the exemplary embodiments disclosed herein may also be encoded as a computer program, stored in server 140, run by server 145, and distributed to client systems 110, 120, and 130 over network 150. Accordingly, network architecture 100 may perform and/or be a means for performing, either alone or in combination with other elements, one or more of the identifying, updating, measuring, determining, providing, storing, changing, and/or invalidating steps disclosed herein. Network architecture 100 may also be used to perform and/or be a means for performing other steps and features set forth in the instant disclosure.

FIG. 2 is a block diagram of an exemplary computing system 210 capable of implementing one or more of the embodiments described and/or illustrated herein. Computing system 210 broadly represents any single or multi-processor computing device or system capable of executing computer-readable instructions. Examples of computing system 210 include, without limitation, workstations, laptops, client-side terminals, servers, distributed computing systems, handheld devices, or any other computing system or device. In its most basic configuration, computing system 210 may include at least one processor 214 and a system memory 216.

Processor 214 generally represents any type or form of processing unit capable of processing data or interpreting and executing instructions. In certain embodiments, processor 214 may receive instructions from a software application or module. These instructions may cause processor 214 to perform the functions of one or more of the exemplary embodiments described and/or illustrated herein. For example, processor 214 may perform and/or be a means for performing, either alone or in combination with other elements, one or more of the identifying, updating, measuring, determining, providing, storing, changing, and/or invalidating steps described herein. Processor 214 may also perform and/or be a means for performing any other steps, methods, or processes described and/or illustrated herein.

System memory 216 generally represents any type or form of volatile or non-volatile storage device or medium capable of storing data and/or other computer-readable instructions. Examples of system memory 216 include, without limitation, random access memory (RAM), read only memory (ROM), flash memory, or any other suitable memory device. Although not required, in certain embodiments computing system 210 may include both a volatile memory unit (such as, for example, system memory 216) and a non-volatile storage device (such as, for example, primary storage device 232, as described in detail below). One or more modules configured to measure compliance with a recovery point objective for an application may be loaded into system memory 216. For example, identification module 101, update module 102, measurement module 103, determination module 104, and/or notification module 105 may be loaded into system memory 216.

In certain embodiments, exemplary computing system 210 may also include one or more components or elements in addition to processor 214 and system memory 216. For example, as illustrated in FIG. 2, computing system 210 may include a memory controller 218, an Input/Output (I/O) controller 220, and a communication interface 222, each of which may be interconnected via a communication infrastructure 212. Communication infrastructure 212 generally represents any type or form of infrastructure capable of facilitating communication between one or more components of a computing device. Examples of communication infrastructure 212 include, without limitation, a communication bus (such as an ISA, PCI, PCIe, or similar bus) and a network.

Memory controller 218 generally represents any type or form of device capable of handling memory or data or controlling communication between one or more components of computing system 210. For example, in certain embodiments memory controller 218 may control communication between processor 214, system memory 216, and I/O controller 220 via communication infrastructure 212. In certain embodiments, memory controller may perform and/or be a means for performing, either alone or in combination with other elements, one or more of the steps or features described and/or illustrated herein, such as identifying, updating, measuring, determining, providing, storing, changing, and/or invalidating.

I/O controller 220 generally represents any type or form of module capable of coordinating and/or controlling the input and output functions of a computing device. For example, in certain embodiments I/O controller 220 may control or facilitate transfer of data between one or more elements of computing system 210, such as processor 214, system memory 216, communication interface 222, display adapter 226, input interface 230, and storage interface 234. I/O controller 220 may be used, for example, to perform and/or be a means for performing, either alone or in combination with other elements, one or more of the identifying, updating, measuring, determining, providing, storing, changing, and/or invalidating steps described herein. I/O controller 220 may also be used to perform and/or be a means for performing other steps and features set forth in the instant disclosure.

Communication interface 222 broadly represents any type or form of communication device or adapter capable of facilitating communication between exemplary computing system 210 and one or more additional devices. For example, in certain embodiments communication interface 222 may facilitate communication between computing system 210 and a private or public network including additional computing systems. Examples of communication interface 222 include, without limitation, a wired network interface (such as a network interface card), a wireless network interface (such as a wireless network interface card), a modem, and any other suitable interface. In at least one embodiment, communication interface 222 may provide a direct connection to a remote server via a direct link to a network, such as the Internet. Communication interface 222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 222 may also represent a host adapter configured to facilitate communication between computing system 210 and one or more additional network or storage devices via an external bus or communications channel. Examples of host adapters include, without limitation, SCSI host adapters, USB host adapters, IEEE 294 host adapters, SATA and eSATA host adapters, ATA and PATA host adapters, Fibre Channel interface adapters, Ethernet adapters, or the like. Communication interface 222 may also allow computing system 210 to engage in distributed or remote computing. For example, communication interface 222 may receive instructions from a remote device or send instructions to a remote device for execution. In certain embodiments, communication interface 222 may perform and/or be a means for performing, either alone or in combination with other elements, one or more of the identifying, updating, measuring, determining, providing, storing, changing, and/or invalidating steps disclosed herein. Communication interface 222 may also be used to perform and/or be a means for performing other steps and features set forth in the instant disclosure.

As illustrated in FIG. 2, computing system 210 may also include at least one display device 224 coupled to communication infrastructure 212 via a display adapter 226. Display device 224 generally represents any type or form of device capable of visually displaying information forwarded by display adapter 226. Similarly, display adapter 226 generally represents any type or form of device configured to forward graphics, text, and other data from communication infrastructure 212 (or from a frame buffer, as known in the art) for display on display device 224.

As illustrated in FIG. 2, exemplary computing system 210 may also include at least one input device 228 coupled to communication infrastructure 212 via an input interface 230. Input device 228 generally represents any type or form of input device capable of providing input, either computer or human generated, to exemplary computing system 210. Examples of input device 228 include, without limitation, a keyboard, a pointing device, a speech recognition device, or any other input device. In at least one embodiment, input device 228 may perform and/or be a means for performing, either alone or in combination with other elements, one or more of the identifying, updating, measuring, determining, providing, storing, changing, and/or invalidating steps disclosed herein. Input device 228 may also be used to perform and/or be a means for performing other steps and features set forth in the instant disclosure.

As illustrated in FIG. 2, exemplary computing system 210 may also include a primary storage device 232 and a backup storage device 233 coupled to communication infrastructure 212 via a storage interface 234. Storage devices 232 and 233 generally represent any type or form of storage device or medium capable of storing data and/or other computer-readable instructions. For example, storage devices 232 and 233 may be a magnetic disk drive (e.g., a so-called hard drive), a floppy disk drive, a magnetic tape drive, an optical disk drive, a flash drive, or the like. Storage interface 234 generally represents any type or form of interface or device for transferring data between storage devices 232 and 233 and other components of computing system 210.

In certain embodiments, storage devices 232 and 233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 232 and 233 may also include other similar structures or devices for allowing computer software, data, or other computer-readable instructions to be loaded into computing system 210. For example, storage devices 232 and 233 may be configured to read and write software, data, or other computer-readable information. Storage devices 232 and 233 may also be a part of computing system 210 or may be a separate device accessed through other interface systems.

In certain embodiments, storage devices 232 and 233 may be used, for example, to perform and/or be a means for performing, either alone or in combination with other elements, one or more of the identifying, updating, measuring, determining, providing, storing, changing, and/or invalidating steps disclosed herein. Storage devices 232 and 233 may also be used to perform and/or be a means for performing other steps and features set forth in the instant disclosure.

Many other devices or subsystems may be connected to computing system 210. Conversely, all of the components and devices illustrated in FIG. 2 need not be present to practice the embodiments described and/or illustrated herein. The devices and subsystems referenced above may also be interconnected in different ways from that shown in FIG. 2. Computing system 210 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 210. All or a portion of the computer program stored on the computer-readable medium may then be stored in system memory 216 and/or various portions of storage devices 232 and 233. When executed by processor 214, a computer program loaded into computing system 210 may cause processor 214 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 210 may be configured as an application specific integrated circuit (ASIC) adapted to implement one or more of the exemplary embodiments disclosed herein.

FIG. 3 is a block diagram of an exemplary system 300 for measuring compliance with a recovery point objective for an application. As illustrated in this figure, exemplary system 300 may include, within system memory 216, one or more modules 310 for performing one or more tasks. Modules 310 may include identification module 101, update module 102, measurement module 103, determination module 104, and notification module 105. Identification module 101 may be programmed to identify a set of mount points on a primary site written to by the application and to identify a secondary site used for asynchronous replication of the primary site. Update module 102 may be programmed to periodically update a time value on each mount point in the set of mount points on the primary site. Measurement module 103 may be programmed to measure a replication lag by calculating a difference between the time value on the mount point and a replication of the time value on a corresponding mount point on the secondary site. Determination module 104 may be programmed to determine the longest replication lag for any mount point in the set of mount points, and notification module 105 may be programmed to determine whether the longest replication lag exceeds the recovery point objective for the application and to provide a notice of a violation of the recovery point objective.

In certain embodiments, one or more of modules 310 in FIG. 3 may represent one or more software applications or programs that, when executed by a computing device, may cause the computing device to perform one or more tasks. For example, as will be described in greater detail below, one or more of modules 310 may represent software modules stored and configured to run on one or more computing devices, such as the devices illustrated in FIG. 4 (e.g., primary site 404, secondary site 406, and/or computing device 402), computing system 210 in FIG. 2, and/or portions of exemplary network architecture 100 in FIG. 1. One or more of modules 310 in FIG. 3 may also represent all or portions of one or more special-purpose computers configured to perform one or more tasks.

As illustrated in FIG. 3, exemplary system 300 may include primary storage device 232 of FIG. 2. According to some embodiments, update module 102 may periodically update a time value on a mount point for primary storage device 232.

Exemplary system 300 may include one or more processors, such as processor 214 of FIG. 2. Processor 214 may execute instructions forming part of one or more modules 310. Exemplary system 300 may further include communication interface 222 of FIG. 2. Communication interface 222 may provide connectivity within exemplary system 300 or between exemplary system 300 and another system.

FIG. 4 is a block diagram of an exemplary system 400 for measuring compliance with a recovery point objective for an application. As illustrated in this figure, exemplary system 400 may include a computing device 402, a primary site 404, and a secondary site 406 connected via network 150. In one embodiment, primary site 404 may include one or more of modules 310.

Primary site 404 may include an application with data asynchronously replicated to secondary site 406. Primary site 404 may include modules 310 to measure compliance with a recovery point objective for the application. For example, a system administrator may initiate a disaster recovery test for primary site 404 and secondary site 406 from computing device 402. Identification module 101 on primary site 404 may then identify a set of mount points on primary site 404. Identification module 101 may also identify secondary site 406. Update module 102 may update a time value on each mount point in the set of mount points on primary site 404. Measurement module 103 may then measure, for each mount point in the set of mount points, a replication lag by calculating the difference between the time value on the mount point and a replication of the time value on a corresponding mount point on secondary site 406.

In some embodiments, at least part of one or more of modules 310 may be located on computing device 402 and/or secondary site 406. For example, part of identification module 101 may be located on computing device 402 (e.g., identification module 101 may read a configuration file located on computing device 402 listing all mount points on the primary site used by the application).

Computing device 402 generally represents any type or form of computing device capable of reading computer-executable instructions. Examples of computing device 402 include, without limitation, laptops, desktops, servers, cellular phones, personal digital assistants (PDAs), multimedia players, embedded systems, combinations of one or more of the same, exemplary computing system 210 in FIG. 2, or any other suitable computing device.

Primary site 404 generally represents any type or form of computing system that is capable of hosting an application. Examples of primary site 404 include, without limitation, application servers and database servers configured to provide various database services and/or run certain software applications. Primary site 404 may also include, without limitation, laptops, desktops, cellular phones, personal digital assistants (PDAs), multimedia players, embedded systems, combinations of one or more of the same, exemplary computing system 210 in FIG. 2, or any other suitable computing device.

Secondary site 406 generally represents any type or form of computing system that is capable of mirroring or hosting a replication of a computing system such as primary site 404. For example, secondary site 406 may include a backup server configured for receiving asynchronous replication. Secondary site 406 may also include, without limitation, laptops, desktops, cellular phones, personal digital assistants (PDAs), multimedia players, embedded systems, combinations of one or more of the same, exemplary computing system 210 in FIG. 2, or any other suitable computing device.

Network 150 generally represents any medium or architecture capable of facilitating communication or data transfer. Examples of network 150 include, without limitation, an intranet, a Wide Area Network ("WAN"), a Local Area Network ("LAN"), a Personal Area Network ("PAN"), the Internet, Power Line Communications ("PLC"), a cellular network (e.g., a GSM Network), all or a portion of exemplary network architecture 100 in FIG. 1, or the like. Network 150 may facilitate communication or data transfer using wireless or wired connections. In one embodiment, network 150 may facilitate communication between computing device 402 and primary site 404. In some embodiments, network 150 may facilitate communication between primary site 404 and secondary site 406.

FIG. 5 is a block diagram of an exemplary system 500 for measuring compliance with a recovery point objective for an application. As illustrated in this figure, exemplary system 500 may include primary site 404 and secondary site 406, which may be connected by network 150.

Primary site 404 may include system memory 216, primary storage device 232, display device 224, communication interface 222, and processor 214 of FIG. 2. Primary storage device 232 may also include a set of mount points 530. Set of mount points 530 may include a mount point 532 and a mount point 536. While set of mount points 530 shows two mount points, a set of mount points may include one mount point or any other number of mount points. Mount point 532 may include a file 533, which may include a time value 534 and a session ID 535. Likewise, mount point 536 may include a file 537, which may include a time value 538 and a session ID 539. Display device 224 may include a notice of violation 560. In other embodiments, mount points may include a time value but no session ID.

As used herein, a "mount point" may refer to any directory, logical drive, and/or any other mapping mechanism that links a storage device or a partition of a storage device to a file system. For example, a "mount point" may a include MICROSOFT WINDOWS drive (e.g., a C: drive), an NFTS volume mount point, or a UNIX, LINUX, or other UNIX-like mount point. The mount point may also reside on a virtual disk in virtual machine embodiments.

As illustrated in FIG. 5, secondary site 406 may include corresponding mount point 542 and corresponding mount point 546. Corresponding mount point 542 may be a mount point associated with data copied from mount point 532, and corresponding mount point 546 may be a mount point associated with data copied from mount point 536. Corresponding mount point 542 may include time value replication 544 and session ID replication 545, and corresponding mount point 546 may include time value replication 548 and session ID replication 549.

System memory 216 may include identification module 101, update module 102, measurement module 103, determination module 104, and notification module 105. System memory 216 may also include a replication lag 524, a replication lag 528, a recovery point objective 550, and an application 551. Application 551 may include any set of one or more computer-executable instructions. Application 551 may include a word processor, a browser, a system tool, a game, and/or any other software application.

Measurement module 103 may measure replication lag 524 by calculating a difference between time value replication 544 and time value 534, and session ID 535 may be compared with session ID replication 545 to determine whether replication lag 524 is valid. Similarly, measurement module 103 may measure replication lag 528 by calculating a difference between time value replication 548 and time value 538, and session ID 539 may be compared with session ID replication 549 to determine whether replication lag 528 is valid. In some embodiments, notification module 105 may determine that replication lag 524 and/or replication lag 528 exceeds recovery point objective 550 and may provide a notice of violation 560 on display device 224.

FIGS. 6-9 are flow diagrams of exemplary computer-implemented methods for measuring compliance with a recovery point objective for an application. The steps shown in FIGS. 6-9 may be performed by any suitable computer-executable code and/or computing system. In some embodiments, the steps shown in FIG. 6-9 may be performed by one or more of the components of system 100 in FIG. 1 and/or system 200 in FIG. 2. For example, at step 602 identification module 101 may identify set of mount points 530, which may be written to by application 551.

Identification module 101 may identify set of mount points 530 in a variety of ways. For example, identification module 101 may identify set of mount points 530 by retrieving set of mount points 530 from a configuration file. Alternatively, identification module 101 may identify set of mount points 530 by monitoring and/or analyzing application 551 to determine which mount points are written to by application 551.

Returning to FIG. 6, at step 604 identification module 101 may identify secondary site 406, which may be used for asynchronous replication (e.g., backup) of primary site 404. For example, identification module 101 may identify secondary site 406 by reading a configuration file or by receiving the identity of the secondary site from a volume replicator.

At step 606, update module 102 may periodically update a time value on each mount point in set of mount points 530 on primary site 404. Update module 102 may update a time value in any number of ways. For instance, update module 102 may update a time value on a mount point by updating the time value in a file stored on the mount point. As an example, /mnt1 may represent mount point 532. In this example, update module 102 may periodically update time value 534, which may be stored in a file at /mnt1/SQN.txt.

Update module 102 may also update a time value on a mount point by updating the time value in metadata of a file system of the mount point. For example, update module 102 may write to the metadata through an unpublished interface (e.g., an Input/Output Control ("IOCTL")). Additionally or alternatively, update module 102 may update a time value on a mount point by extending a file system driver to periodically update the time value.

In some embodiments, at least part of update module 102 may run under the same operating system image as application 551 so that update module 102 may have the same view of primary storage device 232 as application 551. Furthermore, update module 102 may function at the same level of storage abstraction that is visible to application 551. This may help to ensure that mount point time values accurately reflect the latest time of possible data changes corresponding to application 551.

A time value may include any type of value which may be compared with a value of the same type to ascertain the difference in time between the values. For instance, the time value may include a sequentially incremented number. As an example, update module 102 may update the time value every second. The sequentially incremented number may begin at 0 and increment by 1 at each update. An advantage of using sequentially incremented numbers is that time-sync may not be required and the sequentially incremented numbers may be substantially independent of skews. Additionally or alternatively, the time value may include a time stamp. As an example, update module 102 may periodically retrieve the current time from a clock device in computing system 500 of primary site 404 and may update time value 534 and/or 538 with the current time.

Returning to FIG. 6, at step 608 measurement module 103 may, for each mount point in set of mount points 530, measure a replication lag by calculating a difference between the time value on the mount point and a replication of the time value on a corresponding mount point on secondary site 406. In some embodiments, identification module 101 may obtain replicated time values from mount points on a secondary site by taking a point-in-time snapshot of the replicated storage at a time when a disaster-recovery test is started.

The replication lag for a mount point generally indicates the amount of time separating the latest state of the primary site and latest state of replication at the secondary site. For example, application 551 on primary site 404 may write to two mount points, mount point 532 and mount point 536, which may be represented by /mnt1 and /mnt2, respectively. Update module 102 may periodically update the time value for each mount point at /mnt1/SQN.txt and /mnt2/SQN.txt. The time value stored on each mount point may include a sequentially incremented number representing a number of seconds. An administrator may simulate a disaster to the primary site through a disaster recovery test. Measurement module 103 may then read 100 and 125 as the respective time values in the files on the mount points of primary site 404 as of the time of the simulated disaster. Measurement module 103 may further read 75 and 90 as the respective time values in the replicated files on the corresponding mount points of secondary site 406. Measurement module 103 may then calculate the difference of each pair of time values to determine the replication lag in seconds-25 seconds and 35 seconds, respectively. In other words, in this example, replication lag 524 may be 25 seconds and replication lag 528 may be 35 seconds.

Figure 6:
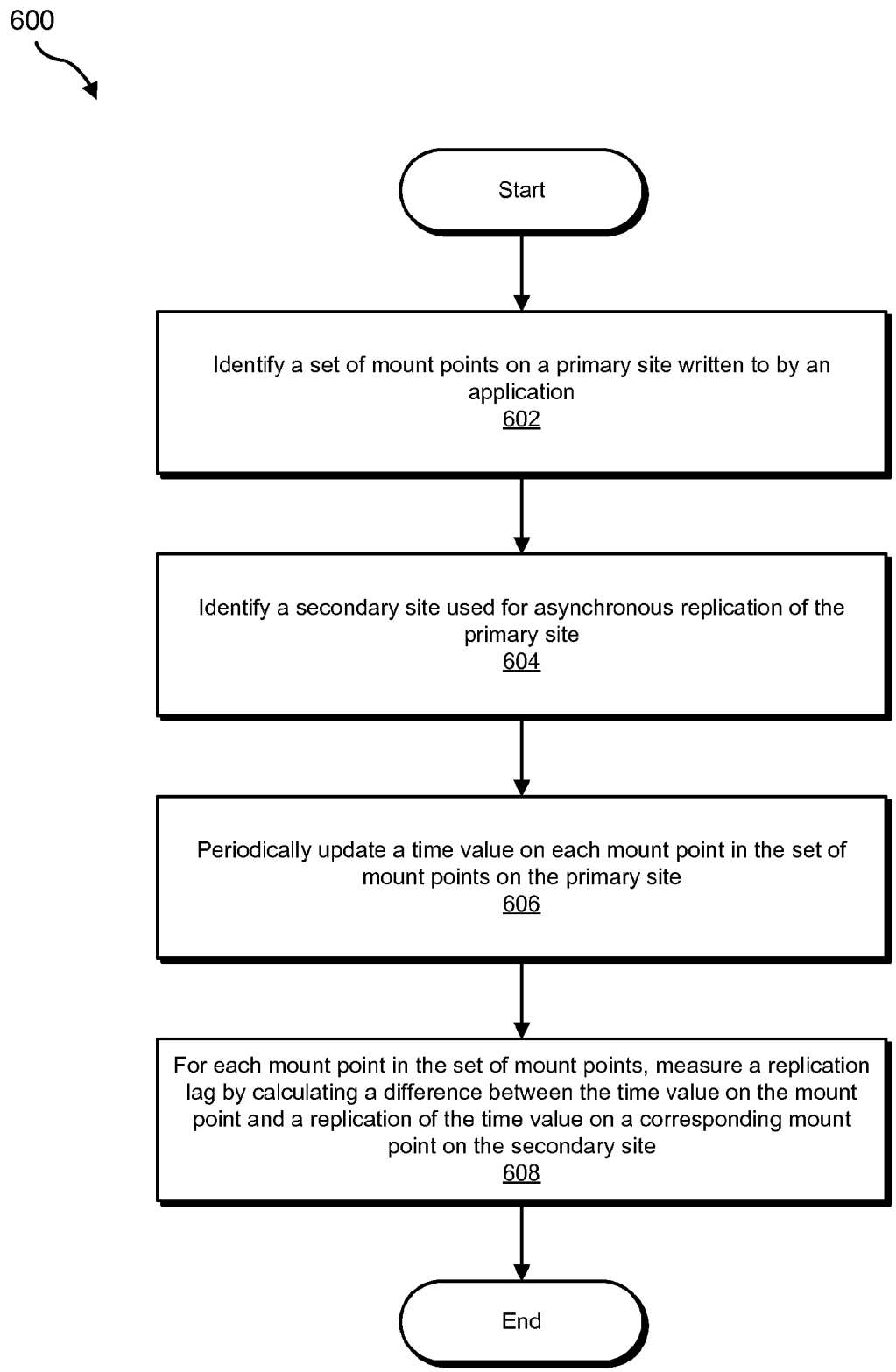
FIG. 6 is a flow diagram of an exemplary method for measuring compliance with a recovery point objective for an application.

An advantage of the method disclosed in FIG. 6 is that it may scale with little or no changes when an application mount point is configured on different storage arrays with different volume managers. For example, an application may have a mount point "mnt1" with LVM on a CLARION array and mount point "mnt2" with VxVM on a HITACHI array. The longest replication lag of the application may be computed as the maximum of the replication lags of /mnt1 and /mnt2.

Figure 7:
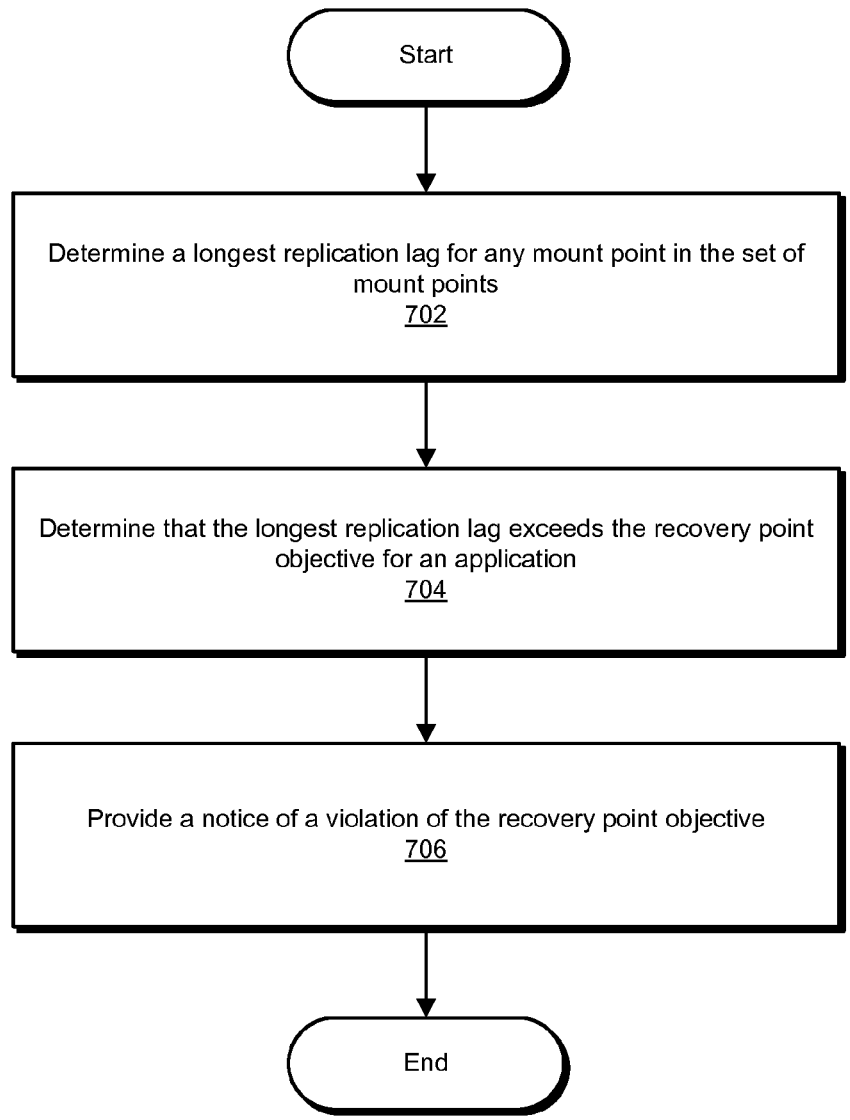
FIG. 7 is a flow diagram of an exemplary method for measuring compliance with a recovery point objective for an application.

FIG. 7 illustrates a method for detecting and providing a notice for a violation of a recovery point objective. The method of FIG. 7 may incorporate or operate in conjunction with the method of FIG. 6. For example, at step 702 determination module 104 may determine a longest replication lag for any mount point in set of mount points 530. Determination module 104 may determine the longest replication lag by comparing each replication lag (e.g., with a MAX( ) function). Using the example provided above for step 608 of FIG. 6, measurement module 103 may have measured the replication lag for mount points /mnt1 and /mnt2 as 25 seconds and 35 seconds, respectively. Determination module 104 may determine that 35 seconds is the longest replication lag.

After determining the longest replication lag, at step 704 notification module 105 may determine that the longest replication lag exceeds the recovery point objective for an application, such as application 551. For example, using the example above, the longest replication lag may be 35 seconds. If recovery point objective 550 is 30 seconds, then notification module 105 may determine that the longest replication lag exceeds recovery point objective 550.

Once notification module 105 determines that the longest replication lag exceeds recovery point objective 550, at step 706 notification module 105 may provide a notice of a violation of recovery point objective 550. Notification module 105 may provide the notice in a variety of contexts. In one example, notification module 105 may provide the notice by displaying the notice on a display device, such as display device 224, a display device connected to computing device 402 of FIG. 4, and/or a display device included in primary site 404. Additionally or alternatively, notification module 105 may record the notice of the violation in a log file, transmit the notice of the violation by e-mail or another electronic message system, and/or print the notice of the violation from a printing device.

Figure 8:
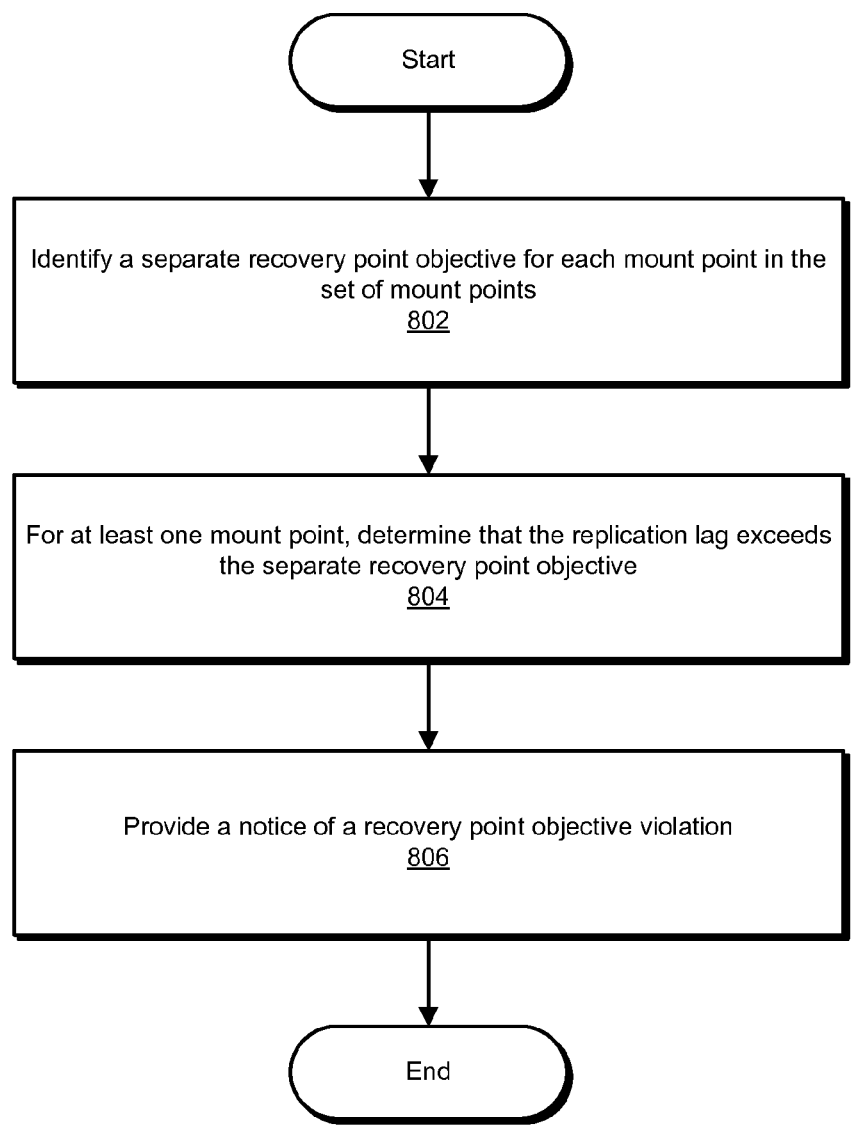
FIG. 8 is a flow diagram of an exemplary method for measuring compliance with a recovery point objective for an application.

FIG. 8 illustrates a method for detecting and providing a notice for a violation of a recovery point objective in the context of multiple recovery point objectives. For example, at step 802 identification module 101 may identify a recovery point objective for each mount point in a set of mount points. Identification module 101 may identify the recovery point objective for each mount point in a variety of ways. For example, identification module 101 may identify the recovery point objective for each mount point by retrieving the recovery point objectives from a configuration file. Alternatively, identification module 101 may identify certain mount points (such as any synchronously replicated mount points) as having no recovery point objective and assign those mount points with a value of 0.

Returning to FIG. 8, at step 804 notification module 105 may determine that, for at least one mount point, the replication lag exceeds the separate recovery point objective. Using the example from step 608 of FIG. 6, measurement module 103 may have measured the replication lag for mount points /mnt1 and /mnt2 as 25 seconds and 35 seconds, respectively. Identification module 101 may have identified the recovery point objectives for the mount points as 20 seconds and none, respectively. Accordingly, notification module 105 may determine that the replication lag of /mnt1 exceeds its recovery point objective.

Once notification module 105 determines that the replication lag exceeds the separate recovery point objective for the mount point, at step 806 notification module 105 may provide a notice of a violation of the separate recovery point objective. Notification module 105 may provide the notice in any suitable manner. For example, notification module 105 may provide the notice by any of the methods provided as examples in the description of step 706 of FIG. 7.

Figure 9:
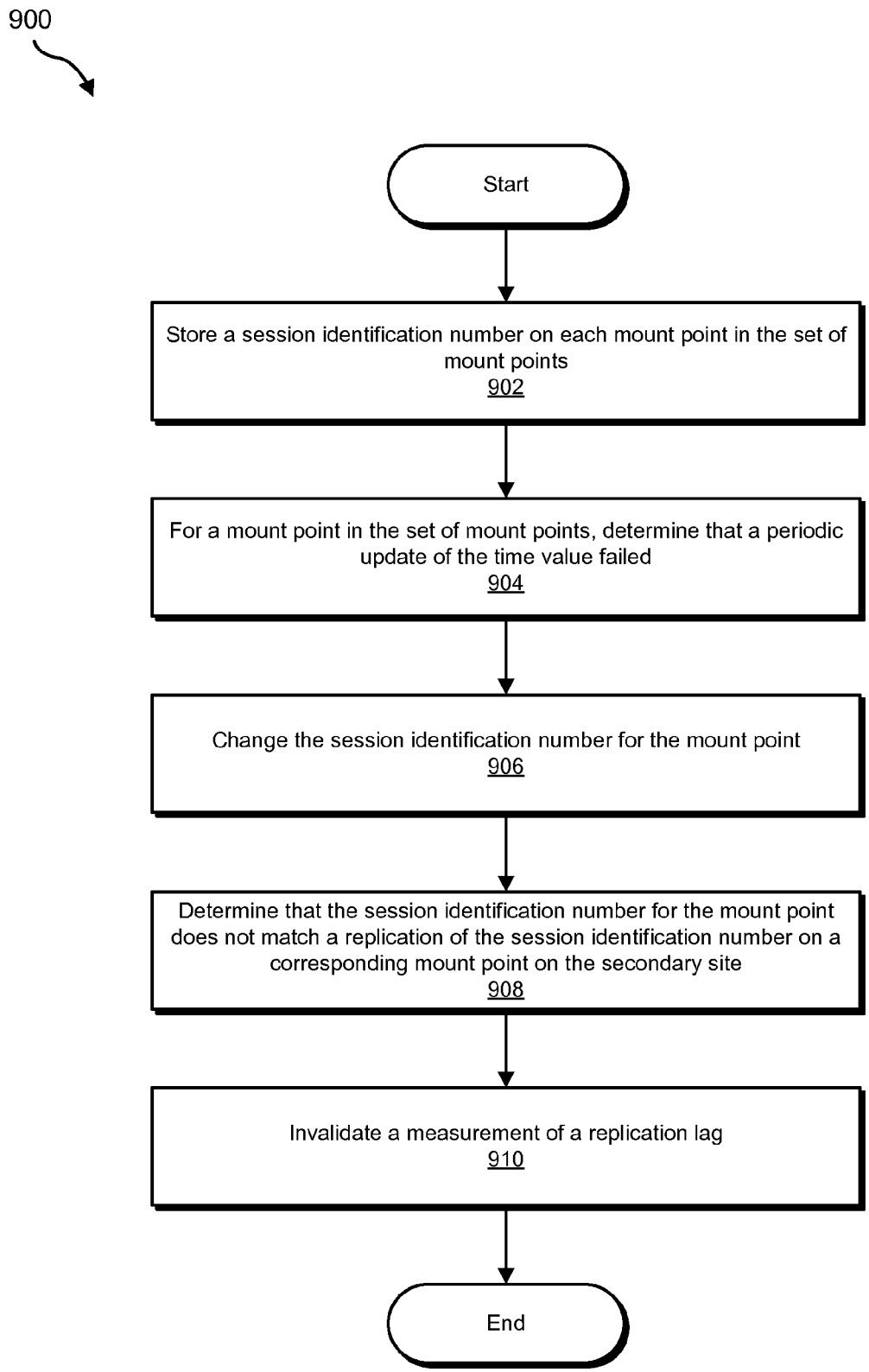
FIG. 9 is a flow diagram of an exemplary method for measuring compliance with a recovery point objective for an application.

FIG. 9 illustrates a method for determining that a measurement of a replication lag is invalid. For example, at step 902 update module 102 may store a session identification number on each mount point in the set of mount points. In some embodiments, update module 102 may store the session identification number in the same location as the time value for the mount point, as shown in FIG. 5.

At step 904, update module 102 may determine that a periodic update of a time value has failed. For example, update module 102 may determine that a periodic update of a time value has failed if it receives an error when attempting to update the time value (e.g., the file containing the time value may be temporarily unavailable for writing due to a system fault). Generally, update module 102 may determine that a periodic update of the time value has failed whenever it fails to update the time value.

At step 906, in response to determining that the periodic update of the time value failed, update module 102 may change the session identification number for the mount point. For example, update module 102 may increment the session identification number. In some embodiments, update module 102 may also reset the time value to zero (e.g., if the time value is a sequentially incremented number) when changing the session identification number. For example, each mount point may start with a session identification number of 1. Update module 102 may store the time value and session number for mount point /mnt1 in /mnt1/SQN.txt. If the latest time value for /mnt1 is 75, /mnt1/SQN.txt may contain 75:1. If update module 102 fails to update the time value to 76, at the next opportunity update module 102 may update /mnt1/SQN.txt with the values 0:2 instead of 76:1.

At step 908, measurement module 103 may determine that the session identification number for the mount point does not match a replication of the session identification number on a corresponding mount point on the secondary site. For example, measurement module 103 may read 75:1 from /mnt1/SQN.txt on the secondary site and 4:2 from /mnt1/SQN.txt on the primary site. Measurement module 103 may determine that the session identification numbers do not match.

At step 910, measurement module 103 may invalidate a measurement of the replication lag for the mount point. For instance, using the example above, measurement module 103 may calculate a replication lag of −71 seconds but may invalidate the calculation based on the different session identification numbers. In some embodiments, measurement module 103 may invalidate the measurement of the replication lag by providing a notice that the measurement of the replication lag of the mount point was invalid.

As previously noted, embodiments of the instant disclosure may be platform agnostic. For example, some embodiments may scale well to virtual machines because they may calculate replication lags of a virtual disk, which may be considered as mount points seen by an application running inside a guest operating system. The virtual disk may reside on any storage, and in some embodiments replication lag may be calculated without knowledge of an underlying storage stack which hosts the virtual disk file. Such embodiments may operate at a virtual disk level and avoid the non-trivial task of mapping a virtual disk file to an underlying storage unit.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, secondary site 406 may be located in a cloud, and one or more of module 310 may operate in a cloud computing environment.

One or more of the software modules described herein may transform data, physical devices, and/or representations of physical devices from one form to another. For example, one or more of modules 310 may transform primary storage device 232 by modifying time values, session IDs, and/or other data on primary storage device 232.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for measuring compliance with a recovery point objective for an application, at least a portion of the method being performed by a computing device comprising at least one processor, the method comprising:

identifying a set of mount points on a primary site written to by the application;

identifying a secondary site used for asynchronous replication of the primary site;

periodically updating a time value on each mount point in the set of mount points on the primary site;

for each mount point in the set of mount points, measuring a replication lag by calculating a difference between the time value on the mount point and a replication of the time value on a corresponding mount point on the secondary site.

2. The computer-implemented method of claim 1, further comprising:

determining a longest replication lag for a mount point in the set of mount points, wherein at least two mount points in the set of mount points have different replication lags;

determining that the longest replication lag exceeds the recovery point objective for the application;

providing a notice of a violation of the recovery point objective.

3. The computer-implemented method of claim 1, further comprising:

obtaining the replication of the time values on the corresponding mount point on the secondary site by taking a point-in-time snapshot of the secondary site at a time when a disaster-recovery test is started.

4. The computer-implemented method of claim 1, wherein the time value comprises a sequentially incremented number that is periodically updated on the primary site and is not periodically updated on the secondary site.

5. The computer-implemented method of claim 1, wherein identifying the set of mount points comprises retrieving the set of mount points from a configuration file.

6. The computer-implemented method of claim 1, further comprising:

identifying a separate recovery point objective for each mount point in the set of mount points, wherein the set of mount points comprises a plurality of mount points;

for at least one mount point, determining that the replication lag exceeds the separate recovery point objective;

in response to determining that the replication lag exceeds the separate recovery point objective, providing a notice of a recovery point objective violation.

7. The computer-implemented method of claim 1, wherein identifying the set of mount points on the primary site written to by the application comprises:

monitoring the application to identify a plurality of mount points written to by the application.

8. The computer-implemented method of claim 1, further comprising:

storing a session identification number on each mount point in the set of mount points;

for a mount point in the set of mount points:

determining that a periodic update of the time value failed;

changing the session identification number for the mount point.

9. The computer-implemented method of claim 8, further comprising:

determining that the session identification number for the mount point does not match a replication of the session identification number on the corresponding mount point on the secondary site;

invalidating the measurement of the replication lag.

10. The computer-implemented method of claim 1, wherein each mount point in the set of mount points comprises a mapping mechanism that links a storage device and/or a partition of a storage device to a file system accessible by the application.

11. The computer-implemented method of claim 10, wherein updating the time value on the mount point comprises at least one of:
   updating the time value in metadata of a file system of the mount point;
   updating the time value in a file stored on the mount point.

12. A system for measuring compliance with a recovery point objective for an application, the system comprising:
   an identification module programmed to:
      identify a set of mount points on a primary site written to by the application for which compliance with the recovery point objective is being measured;
      identify a secondary site used for asynchronous replication of the primary site;
   an update module programmed to:
      periodically update a time value on each mount point in the set of mount points on the primary site;
   a measurement module programmed to:
      for each mount point in the set of mount points, measure a replication lag by calculating a difference between the time value on the mount point and a replication of the time value on a corresponding mount point on the secondary site;
   one or more processors configured to execute the identification module, the update module, and the measurement module.

13. The system of claim 12, further comprising a determination module programmed to determine a longest replication lag for any mount point in the set of mount points.

14. The system of claim 13, wherein the replication lag indicates an amount of time separating a latest state of the primary site and a latest state of replication of the primary site at the secondary site.

15. The system of claim 12, wherein:
   the primary site comprises a primary storage device;
   the set of mount points comprises a plurality of mount points on the primary storage device;
   a time value on a first mount point in the plurality of mount points is different than a time value on a second mount point in the plurality of mount points.

16. The system of claim 12, wherein the set of mount points comprises at least two mount points written to by the application that are configured on different storage arrays with different volume managers.

17. The system of claim 12, wherein the update module periodically updates a time value on each mount point in the set of mount points on the primary site by periodically retrieving a current time from a clock device of a computing system of the primary site.

18. The system of claim 12, wherein compliance with the recovery point objective for the application is measured while the application is not booted up.

19. The system of claim 12, wherein compliance with the recovery point objective for the application is measured while the application is not performing input/output operations.

20. A computer-readable-storage medium comprising one or more computer-executable instructions that, when executed by a computing device, cause the computing device to:
   identify a set of mount points on a primary site written to by an application for which compliance to a recovery point objective is being measured;
   identify a secondary site used for asynchronous replication of the primary site;
   periodically update a time value on each mount point in the set of mount points on the primary site;
   for each mount point in the set of mount points, measure a replication lag by calculating a difference between the time value on the mount point and a replication of the time value on a corresponding mount point on the secondary site.

* * * * *